US011798304B2

(12) United States Patent
Takeishi

(10) Patent No.: US 11,798,304 B2
(45) Date of Patent: Oct. 24, 2023

(54) IMAGE PROCESSING APPARATUS, IMAGE PROCESSING METHOD, AND STORAGE MEDIUM FOR DETERMINING RELIABILITY OF ROUNDING PROCESSING

(71) Applicant: CANON KABUSHIKI KAISHA, Tokyo (JP)

(72) Inventor: Hiroki Takeishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 17/539,546

(22) Filed: Dec. 1, 2021

(65) Prior Publication Data
US 2022/0189191 A1 Jun. 16, 2022

(30) Foreign Application Priority Data
Dec. 10, 2020 (JP) ................. 2020-204959

(51) Int. Cl.
*G06V 30/416* (2022.01)
*G06V 10/98* (2022.01)
*G06V 30/412* (2022.01)

(52) U.S. Cl.
CPC ............ *G06V 30/416* (2022.01); *G06V 10/98* (2022.01); *G06V 30/412* (2022.01)

(58) Field of Classification Search
CPC .... G06V 30/416; G06V 30/412; G06V 30/12; G06V 30/10; G06V 10/98
See application file for complete search history.

(56) References Cited

U.S. PATENT DOCUMENTS

2015/0117747 A1* 4/2015 Smith ................. G06V 30/416
382/137

FOREIGN PATENT DOCUMENTS

CN 111738252 A * 10/2020
JP 2019117527 A 7/2019

OTHER PUBLICATIONS

Datta, Keshav. "Credit Card Processing Using Cell Phone Images." Jan 1 (2011): 1-7. (Year: 2011).*

* cited by examiner

*Primary Examiner* — Carol Wang
(74) *Attorney, Agent, or Firm* — ROSSI, KIMMS & McDOWELL LLP

(57) ABSTRACT

An image processing apparatus that can determine reliability of rounding processing on numerical values obtained by character recognition processing. The image processing apparatus performs character recognition of a plurality of numerical values from image data, acquires a learning result indicating a rounding processing method from a storage unit that stores the learning result, and determines reliability of the character recognition on the basis of a difference between a calculation result of the plurality of numerical values and a calculation result of the plurality of numerical values in a case where the rounding processing indicated by the acquired learning result is applied.

11 Claims, 12 Drawing Sheets

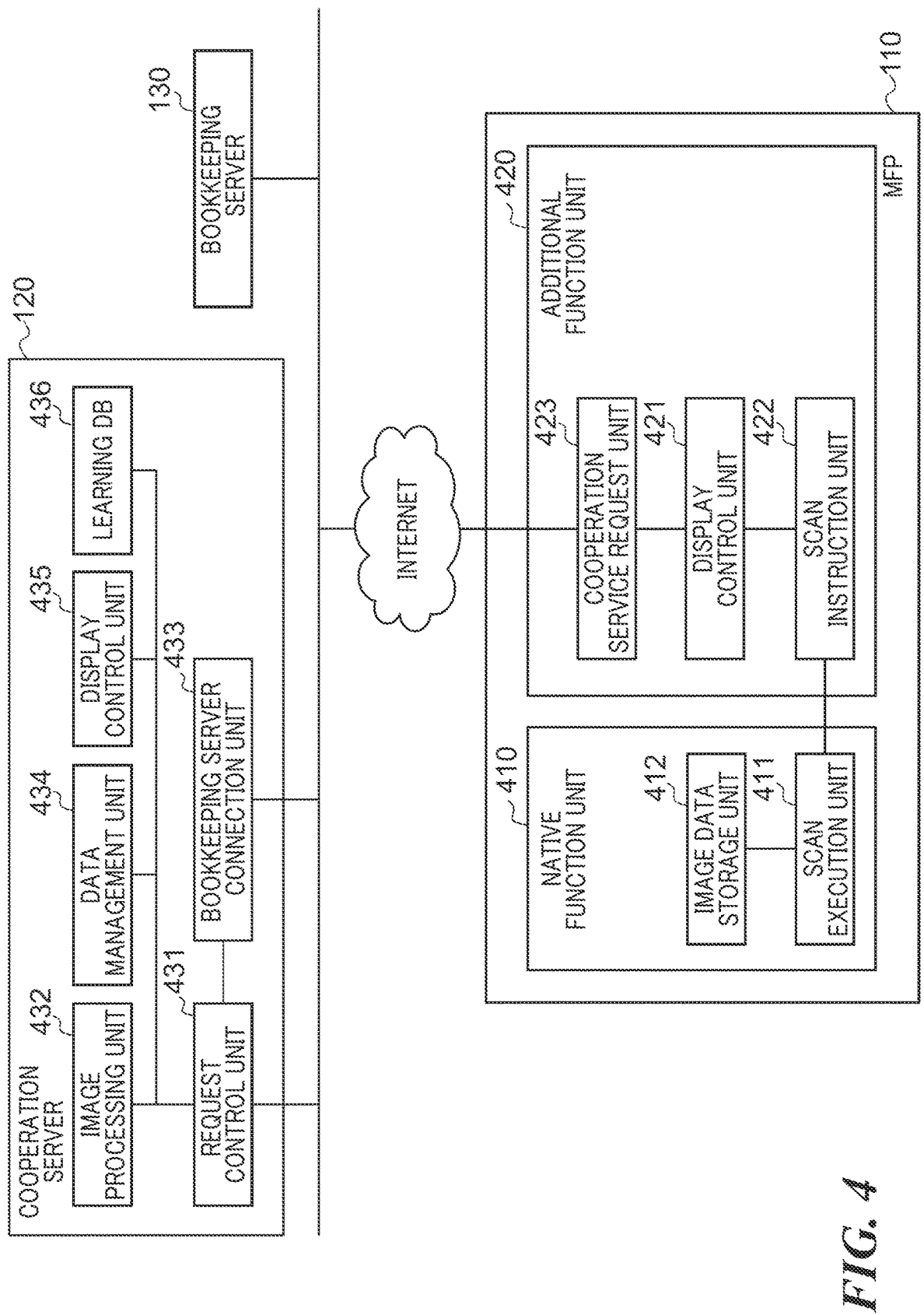

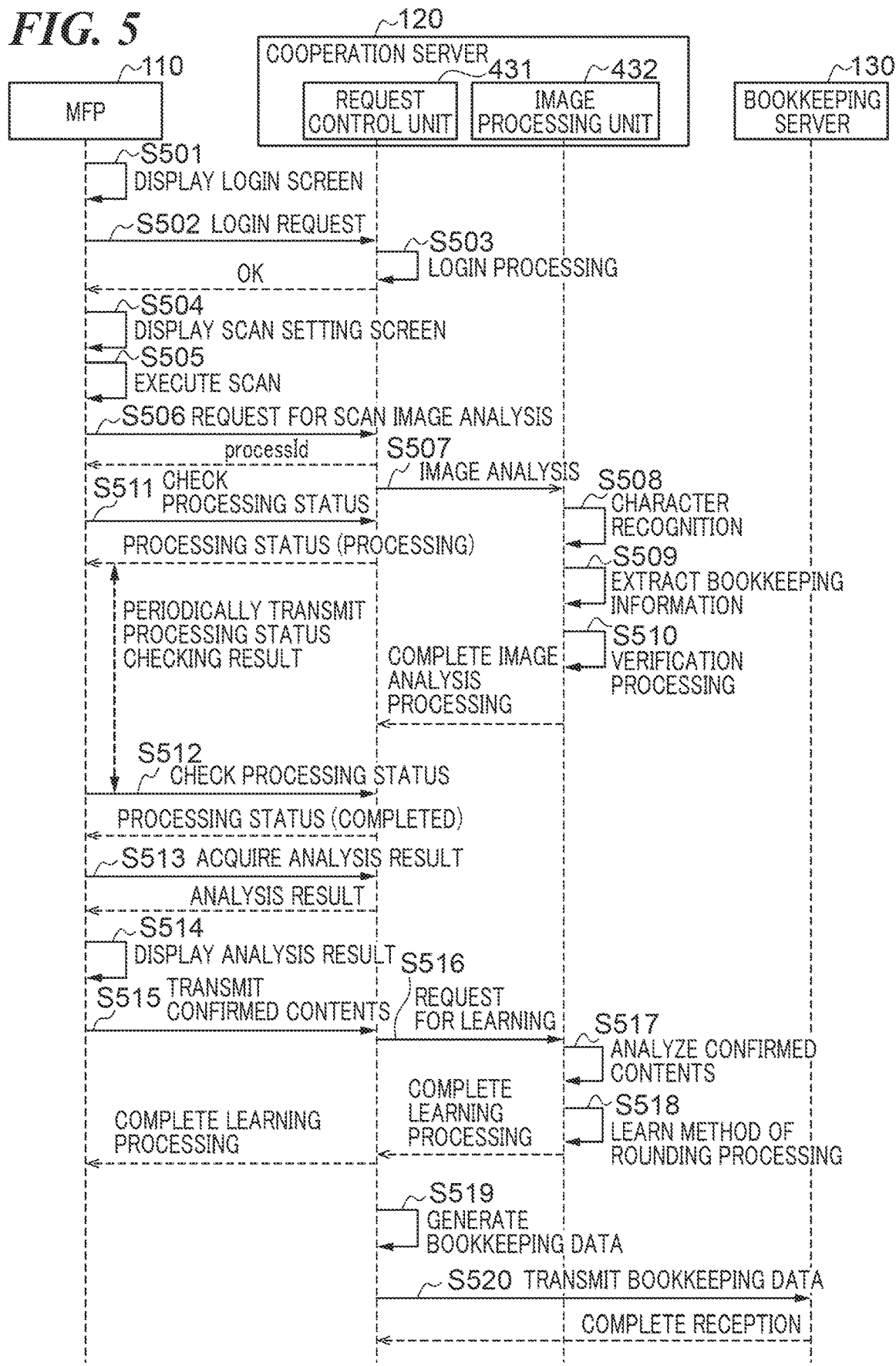

FIG. 6A

BOOKKEEPING/ACCOUNTING INFORMATION CONFIRMATION SCREEN

〒100-9999
A-A-A, OTA-KU, TOKYO

SHIMOMARUKO COMPANY

ESTIMATE
ESTIMATE NUMBER: R12-3500
ISSUANCE DATE: 2017/09/29

| AMOUNT | TAX RATE |
|---|---|
| 10400 | 8 |
| 10345 | 8 |
| 113 | 10 |
| 1000 | 10 |

EXCLUDING TAX (8%): 20745
EXCLUDING TAX (10%): 1113
TOTAL AMOUNT: 23628

BOOKKEEPING/ACCOUNTING INFORMATION CONFIRMATION SCREEN

SCAN IMAGE

ESTIMATE
〒100-9999
A-A-A, OTA-KU, TOKYO
ESTIMATE NUMBER: R12-3500
ISSUANCE DATE: 2017/09/29
SHIMOMARUKO COMPANY

| AMOUNT | TAX RATE |
|---|---|
| 10400 | 8 |
| 10345 | 8 |
| 113 | 10 |
| 1000 | 10 |

EXCLUDING TAX (8%): 20745
EXCLUDING TAX (10%): 1113
TOTAL AMOUNT: 23628 ⚠

BOOKKEEPING/ACCOUNTING INFORMATION CONFIRMATION SCREEN

SCAN IMAGE

ESTIMATE
〒100-9999
A-A-A, OTA-KU, TOKYO
ESTIMATE NUMBER: R12-3500
ISSUANCE DATE: 2017/09/29
SHIMOMARUKO COMPANY

| AMOUNT | TAX RATE |
|---|---|
| 10400 | 8 |
| 10345 | 8 |
| 113 | 10 |
| 1000 | 10 |

EXCLUDING TAX (8%): 20745
EXCLUDING TAX (10%): 1113
TOTAL AMOUNT: 23629

[OK]

IMAGE PROCESSING APPARATUS, IMAGE PROCESSING METHOD, AND STORAGE MEDIUM FOR DETERMINING RELIABILITY OF ROUNDING PROCESSING

BACKGROUND OF THE INVENTION

Field of the Invention

The present invention relates to an image processing apparatus, an image processing method, and a storage medium that determine reliability of rounding processing.

Description of the Related Art

Conventionally, a technique of generating electronic data based on a description content of a form by scanning and digitizing the form of a paper medium has been used. For example, it is possible to extract a detailed amount, a total amount, and the like as character information by performing character recognition processing on a form image such as an estimate sheet regarding bookkeeping or accounting. The extracted character information may be presented to the user or may be automatically input into bookkeeping software or accounting software. As a result, it is possible to save time and effort to manually input information such as the amount of money into the bookkeeping software or the accounting software on the basis of the amount of money or the like described in the form of the paper medium.

As a related technique, a technique of Japanese Laid-Open Patent Publication (kokai) No. 2019-117527 is proposed. In the technique disclosed in Japanese Laid-Open Patent Publication (kokai) No. 2019-117527, in order to determine correctness of passbook statement data, subtraction processing for a withdrawal amount of the passbook statement data and addition processing for a deposit amount are performed in response to acquisition of the verification data, and a post-processing amount is calculated and output.

There is a case where a form is scanned, numerical data such as an amount of money described in the form is acquired by character recognition processing, and predetermined calculation is performed on the acquired numerical values. Then, a verification process for verifying whether the calculation result is correct is performed. When an operation is performed on numerical values obtained by the character recognition processing, fractions may occur. In rounding processing, for example, a processing method may be different depending on a user, an organization, or the like, and when unintended rounding processing is applied, an error may occur in a verification result of the numerical values obtained by the character recognition processing. In this case, the reliability of the calculation result based on the numerical values obtained by the character recognition processing decreases. The technique disclosed in Japanese Laid-Open Patent Publication (kokai) No. 2019-117527 does not solve such a problem.

SUMMARY OF THE INVENTION

The present invention provides an image processing apparatus, an image processing method, and a storage medium capable of determining reliability of rounding processing on numerical values obtained by character recognition processing.

Accordingly, the present invention provides an image processing apparatus that performs character recognition of a plurality of numerical values from image data, acquires a learning result indicating a rounding processing method from a storage unit that stores the learning result, and determines reliability of the character recognition on the basis of a difference between a calculation result of the plurality of numerical values and a calculation result of the plurality of numerical values in a case where the rounding processing indicated by the acquired learning result is applied.

According to the present invention, it is possible to determine reliability of rounding processing on numerical values obtained by character recognition processing.

Further features of the present invention will become apparent from the following description of exemplary embodiments (with reference to the attached drawings).

BRIEF DESCRIPTION OF THE DRAWINGS

FIG. 4 is a diagram showing an example of a software configuration of the image processing system.

FIG. 5 is a sequence diagram showing an example of a flow of processing of the image processing system according to a first embodiment.

FIGS. 6A to 6C are diagrams showing screen examples displayed on the MFP.

DESCRIPTION OF THE EMBODIMENTS

The present invention will now be described in detail below with reference to the accompanying drawings showing embodiments thereof.

First Embodiment

Figure 1:
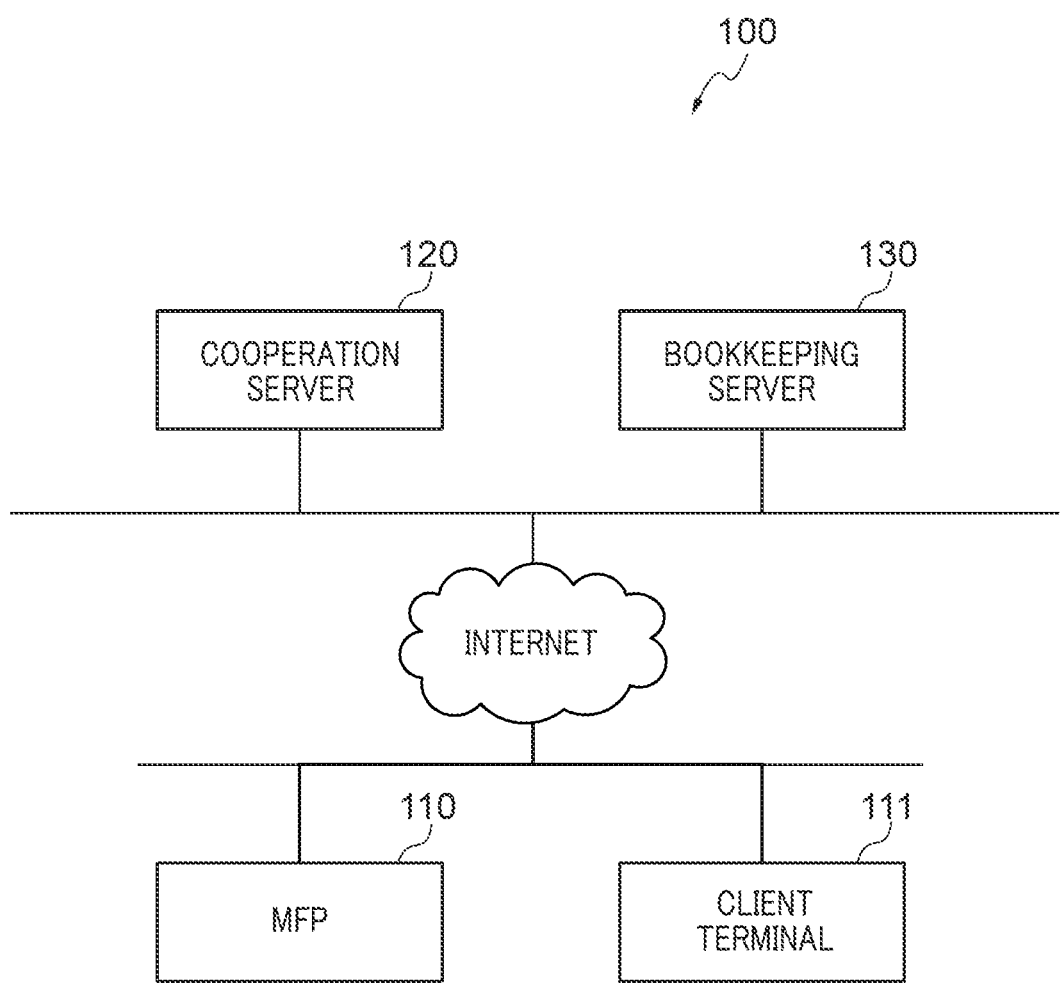
FIG. 1 is a diagram showing an example of an image processing system.

FIG. 1 is a diagram showing an example of an image processing system 100. The image processing system 100 includes a multifunction peripheral (MFP) 110, a client terminal 111, a cooperation server 120, and a bookkeeping server 130. The MFP 110 and the client terminal 111 are connected by a local area network (LAN), and communicably connected to a server that provides various services on the Internet. In the example of FIG. 1, the MFP 110 and the client terminal 111 can communicate with the cooperation server 120 and the bookkeeping server 130.

The MFP 110 is a multifunction peripheral having a plurality of functions such as a scanner and a printer. The client terminal 111 is a server that requests the cooperation server 120 for a service and receives provision of the service. The client terminal 111 is, for example, a personal computer, and can use the service of the cooperation server 120 with the aid of an application executed by the client terminal 111. The MFP 110 or the client terminal 111 is another device having a function of reading an image. As other devices, terminals (for example, a smartphone, a tablet terminal, or the like) other than the MFP 110 and the client terminal 111 can be used.

The cooperation server 120 is an image processing apparatus that provides a service cooperating with the MFP 110. The cooperation server 120 has a function of storing an image file scanned by the MFP 110, a function of transferring an image file to another service such as a storage service capable of storing a file, and the like. The bookkeeping server 130 is a server having a function of storing a file via the Internet and a function of acquiring a file by a web browser. The bookkeeping server 130 has functions such as bookkeeping software and accounting software. The bookkeeping server 130 may be an accounting server or a server that performs bookkeeping processing and accounting processing. Furthermore, the bookkeeping server 130 may function as a cloud storage.

The image processing system 100 is not limited to the example of FIG. 1. For example, the MFP 110 may also serve as the client terminal 111 or the cooperation server 120. The cooperation server 120 may be disposed not on the Internet but on a server on a LAN. The bookkeeping server 130 can also function as an email server. In this case, the bookkeeping server 130 attaches the scanned image to an email and transmits the email.

Figure 2:
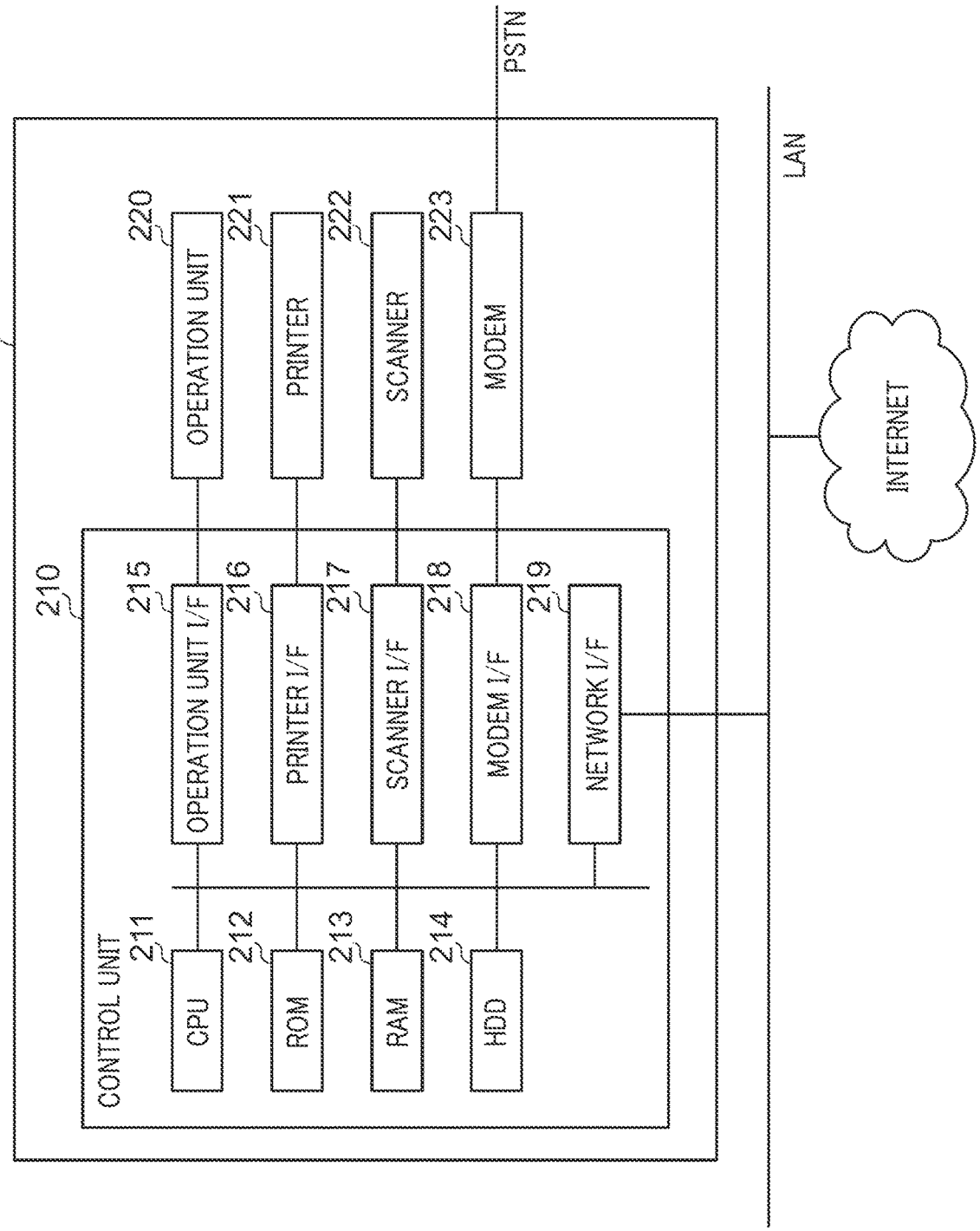
FIG. 2 is a diagram showing an example of a hardware configuration of an MFP.

FIG. 2 is a diagram showing an example of a hardware configuration of the MFP 110. The MFP 110 includes a control unit 210, an operation unit 220, a printer unit 221, a scanner unit 222, and a modem 223. The control unit 210 includes a CPU 211, a ROM 212, a RAM 213, an HDD 214, an operation unit I/F 215, a printer I/F 216, a scanner I/F 217, a modem I/F 218, and a network I/F 219. The control unit 210 controls the entire operation of the MFP 110.

The CPU 211 reads a control program stored in the ROM 212, and executes and controls various functions of the MFP 110. The RAM 213 is a main memory of the CPU 211 and is used as a temporary storage area which is a work area or the like. Hereinafter, it is assumed that one CPU 211 executes various processes using one memory (for example, the RAM 213 or the HDD 214), but a plurality of CPUs may execute various processes. In addition, various processes may be executed using a plurality of RAMs or HDDs. The HDD 214 is an auxiliary storage device (hard disk drive) that stores image data and various programs.

The operation unit I/F 215 is an interface that connects the operation unit 220 and the control unit 210. The operation unit 220 includes a touch panel, a keyboard, and the like, and receives an operation and an instruction from a user. The printer I/F 216 is an interface that connects the printer unit 221 and the control unit 210. The image data for printing is transferred from the control unit 210 to the printer unit 221 via the printer I/F 216, and an image is printed on a recording medium on the basis of the image data for printing. The scanner I/F 217 is an interface that connects the scanner unit 222 and the control unit 210. The scanner unit 222 reads a document placed on a document table or an auto document feeder (ADF) to generate image data, and outputs the image data to the control unit 210 via the scanner I/F 217.

The MFP 110 can print out (copy) the image data generated by the scanner unit 222 from the printer unit 221, and can also transmit a file or send an email. The modem I/F 218 is an interface that connects the modem 223 and the control unit 210. The modem 223 transfers image data to and from a facsimile machine on a public switched telephone network (PSTN) by facsimile communication. The network I/F 219 is an interface that connects the control unit 210 to the LAN. The MFP 110 transmits and receives image data and information to and from each service on the Internet using the network I/F 219.

Figure 3:
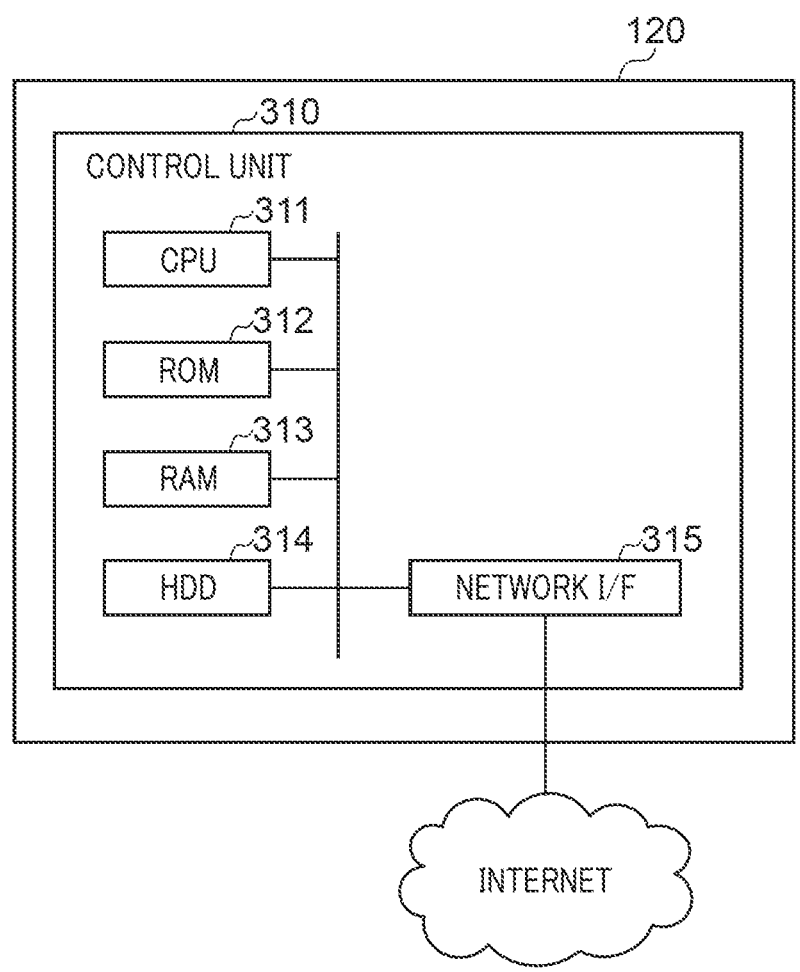
FIG. 3 is a diagram showing an example of a hardware configuration of a cooperation server.

FIG. 3 is a diagram showing an example of a hardware configuration of the cooperation server 120. A similar configuration may be adopted for the client terminal 111 and the bookkeeping server 130. The cooperation server 120 includes a control unit 310, and the control unit 310 includes a CPU 311, a ROM 312, a RAM 313, an HDD 314, and a network I/F 315. The CPU 311 reads a control program stored in the ROM 312, develops the control program in the RAM 313, and executes the developed control program to control the entire operation of the cooperation server 120. The CPU 311 corresponds to a recognition unit, an acquisition unit, and a determination unit. The RAM 313 is a main memory of the CPU 311 and is used as a temporary storage area which is a work area or the like. The HDD 314 is an auxiliary storage device that stores image data and various programs. The network I/F 315 is an interface that connects the cooperation server 120 to the Internet. The cooperation server 120 and the bookkeeping server 130 receive processing requests from other devices via the network I/F 315 and transmit and receive various types of information.

FIG. 4 is a diagram showing an example of a software configuration of the image processing system 100. The MFP 110 includes a native function unit 410 and an additional function unit 420. Each unit included in the native function unit 410 is a function normally installed in the MFP 110. On the other hand, the additional function unit 420 is an application additionally installed in the MFP 110. For example, the additional function unit 420 is an application based on Java (registered trademark), and can easily add a function to the MFP 110. Another additional application may be installed in the MFP 110.

The native function unit 410 includes a scan execution unit 411 and an image data storage unit 412. The additional function unit 420 includes a display control unit 421, a scan instruction unit 422, and a cooperation service request unit 423. The display control unit 421 displays a UI screen for receiving an operation from the user on a liquid crystal display unit of the operation unit 220 having a touch panel function. The displayed UI screen is, for example, a screen for inputting authentication information for accessing the cooperation server 120 and performing scan setting, a screen for performing a scan start operation, and a preview screen. The scan instruction unit 422 sends a request for scan processing to the scan execution unit 411 together with a scan setting value according to a user instruction input via the UI screen.

The scan execution unit 411 receives a scan request including the scan setting value from the scan instruction unit 422. In accordance with the received scan request, the scan execution unit 411 controls the scanner unit 222 via the scanner I/F 217 to read the document placed on the document table or the ADF. As a result, scanned image data is generated. The generated image data is sent to the image data storage unit 412. The scan execution unit 411 sends a scan image identifier uniquely indicating the stored image data to the scan instruction unit 422. The scan image identifier is a number, a symbol, an alphabet, or the like for uniquely identifying an image scanned by the MFP 110. The image data storage unit 412 stores the scanned image data received from the scan execution unit 411 in the HDD 214.

The scan instruction unit 422 acquires, from the image data storage unit 412, the image data corresponding to the scan image identifier received from the scan execution unit 411. The scan instruction unit 422 sends a request for transmitting an instruction to cause the cooperation server 120 to process the acquired scanned image data to the cooperation service request unit 423. The cooperation service request unit 423 requests the cooperation server 120 to perform various types of processing. For example, the cooperation service request unit 423 makes requests for login, analysis of image data, transmission of image data, and the like. Communication between the MFP 110 and the cooperation server 120 may be performed by a protocol such as REST or SOAP, or may be performed by another protocol. Each function of the native function unit 410 and the additional function unit 420 described above is implemented by the CPU 211 executing a program.

The cooperation server 120 includes a request control unit 431, an image processing unit 432, a bookkeeping server connection unit 433, a data management unit 434, a display control unit 435, and a learning DB 436. The request control unit 431 is on standby in a state of being able to receive a request from an external device. When receiving a request from another apparatus such as the MFP 110 or the client terminal 111, the request control unit 431 instructs the image processing unit 432, the bookkeeping server connection unit 433, and the data management unit 434 to perform processing in response to the received request. The image processing unit 432 performs character recognition processing such as optical character recognition (OCR) on the image data, and also performs processing on the image data. The function (recognition unit) of the character recognition processing of the image processing unit 432 may be realized by, for example, a dedicated circuit or the like.

The bookkeeping server connection unit 433 requests the bookkeeping server 130 and the cloud storage to perform processing. A cloud service generally stores a file in a cloud storage according to a protocol such as REST or SOAP, and discloses various interfaces for acquiring the stored file. The bookkeeping server connection unit 433 operates the cloud storage using the disclosed cloud storage interface. The data management unit 434 holds user information, various types of setting data, and the like managed by the cooperation server 120.

The display control unit 435 returns screen configuration information (HTML, CSS, etc) necessary for screen display in response to a request received from a web browser operating on a terminal (personal computers, tablet terminals, smartphones, and the like) connected via the Internet. Using the terminal, the user can check user information registered in the cooperation server 120, change settings at the time of scanning, and the like via the screen displayed in the web browser. The learning DB 436 as a storage unit is a database that holds a learning result in association with a ScopeID. Details will be described later. The additional function unit 420 of the MFP 110 may be included in the client terminal 111, for example. The operation of each unit of the cooperation server 120 described above is realized by the CPU 311 executing the control program.

FIG. 5 is a sequence diagram showing an example of a flow of processing of the image processing system 100 according to the first embodiment. The sequence diagram of FIG. 5 shows a flow of processing when the MFP 110 converts image data generated by scanning a document such as a form into a file and transmits the file to the bookkeeping server 130. Although FIG. 5 shows an example in which the MFP 110 communicates with the cooperation server 120, the client terminal 111 may execute the analysis result acquisition, screen display, correction instruction, and the like.

The MFP 110 displays a main screen on which buttons for performing a plurality of functions that can be provided are arranged on the operation unit 220 (touch panel). By installing an additional application for transmitting the scanned form to the bookkeeping server in the MFP 110, a button for using the function of the application may be displayed on the main screen of the MFP 110. Hereinafter, the additional application is referred to as a "scan application". When a button in the main screen is pressed using the operation unit 220, a screen for transmitting the scanned form to the bookkeeping server is displayed. Then, the processing shown in the sequence of FIG. 5 is performed. The scan application is executed by the CPU 211 of the MFP 110.

First, when executing the scan application, the CPU 211 displays a login screen for inputting authentication information for accessing the cooperation server 120 on the operation unit 220 (S501). For example, the user inputs authentication information (a user name and a password) using the operation unit 220. When the authentication information is input on the login screen, the CPU 211 transmits a login request including the authentication information to the cooperation server 120 (S502). The request control unit 431 of the cooperation server 120 verifies whether the user name and password included in the login request are valid (S503), and if the verification result is valid, returns an access token to the MFP 110. The following various requests from the MFP 110 to the cooperation server 120 are transmitted together with the access token. As a result, the cooperation server 120 can specify the user to be authenticated without requiring the input of the authentication information each time the communication between the MFP 110 and the cooperation server 120 is performed. Any method (Basic authentication, Digest authentication, authorization using OAuth, and the like) can be applied as a method of user authentication.

The CPU 211 of the MFP 110 displays a scan setting screen after the login process is completed (S504). It is assumed that settings related to reading of various scans are made using the operation unit 220, and a "scan start" button displayed on a screen of the operation unit 220 is pressed in a state where a paper form to be scanned is placed on a document table, an ADF, or the like. The CPU 211 executes scanning to generate image data obtained by digitizing a form (S505). The digitized paper medium is not limited to a form. For example, the paper medium may be a document in which a plurality of pieces of character information is described. The CPU 211 transmits the scanned image (image data) generated by the scan processing and the ScopeID that is an identifier uniquely identifying the group of users who have requested the cooperation server 120 to analyze the image data (S506). The ScopeID is an identifier for specifying a range to which the learning result is applied, and is uniquely associated with a group, a user, or the like managed by the data management unit 434.

The request control unit 431 of the cooperation server 120 issues an image analysis start instruction to the image processing unit 432 in response to the cooperation server 120 receiving image data analysis request (S507). The request control unit 431 of the cooperation server 120 returns a processId, which is an identifier uniquely indicating the analysis requested to the cooperation server 120, to the MFP 110 without waiting for completion of the image analysis processing by the image processing unit 432. The image processing unit 432 of the cooperation server 120 executes the image analysis processing of S508 to S510.

The image processing unit 432 performs character recognition processing such as OCR on the image data such as to perform analysis processing and extraction processing of character information included in the image data (S508). The character information obtained by the analysis processing and the extraction processing is a numerical value, a character, a symbol, or the like. The image processing unit 432 converts bookkeeping information such as an amount of money, a tax rate, and an item used in the bookkeeping server 130 within the extracted character information into structured electronic data (S509). The bookkeeping information may be accounting information. The image processing unit 432 executes verification processing (S510). The verification process will be described later. After executing the verification processing in S510, the image processing unit 432 notifies the request control unit 431 that the image analysis processing has been completed.

The CPU 211 of the MFP 110 uses the processId received as a response to S506 to periodically check the processing status of the image analysis of the processId with respect to the cooperation server 120 (S511, S512). For example, the cooperation server 120 periodically checks the processing status of the image analysis of the processId at intervals of about several hundred milliseconds to several milliseconds. The processing of S508 to S510 by the cooperation server 120 and the processing of S511 by the MFP 110 are performed in parallel. The processing of S511 indicates that the MFP 110 has received a response indicating that the processing status ("status" described later) indicates that the cooperation server 120 is in the middle of processing as the result of checking the processing status of the image analysis. The checking of the processing status of the image analysis is continuously performed until the MFP 110 acquires an image processing completion response from the cooperation server 120 (until the timing of S512). When the request control unit 431 of the cooperation server 120 receives the request for checking the processing status in S511, the request control unit 431 checks the processing status of the processId and returns a response to the MFP 110.

The response includes "status" indicating at least a character string indicating the current processing status, a numerical value, or the like. For example, when "status" is "processing", it indicates that the cooperation server 120 is in the middle of processing. When the "status" is "completed", it indicates that the processing of the cooperation server 120 is completed. The response when the "status" is "completed" includes information such as an analysis result and scan settings of the scan image together with the status. When the "status" is "failed", it indicates that the processing of the cooperation server 120 has failed. It should be noted that the "status" may indicate another status.

The processing of S512 indicates that the MFP 110 has received a response indicating that the processing status ("status") indicates that the processing of the cooperation server 120 is completed as the result of checking the processing status of the image analysis.

The CPU 211 of the MFP 110 accesses the location designated by a URL stored in the processing result information included in the response, and acquires the result information of the image analysis processing (S513). Using the result information acquired in S513, the CPU 211 displays the analysis result of the electronic data for the bookkeeping server 130 on the screen of the operation unit 220 (S514). The screen display of the analysis result in S514 may be performed on the display device of the client terminal 111.

The user can check the screen displayed on the operation unit 220 and correct the contents displayed on the screen. When a correction operation is performed on the operation unit 220, the CPU 211 receives the operation. When receiving the operation of confirming the contents displayed on the screen, the CPU 211 generates electronic data to be processed by the bookkeeping server 130 based on the confirmed contents, and transmits the generated electronic data to the cooperation server 120 (S515). When the correction is made, the electronic data includes information of a correction result corrected by the user. Upon receiving the electronic data transmitted from the MFP 110, the request control unit 431 of the cooperation server 120 requests the image processing unit 432 to perform learning process (S516). The image processing unit 432 analyzes the confirmed contents received in S515 (S517). When the correction is made by the user, the image processing unit 432 also analyzes the corrected contents. The image processing unit 432 analyzes the confirmed contents and learns the processing method of the rounding processing (S518). The image processing unit 432 stores the learning result in the learning DB 436 in association with the ScopeID. Details of the learning process will be described later.

Upon receiving the information indicating that the learning process has been completed from the image processing unit 432, the request control unit 431 notifies the MFP 110 of the information indicating that the learning process has been completed. The request control unit 431 refers to the scan setting registered in the cooperation server 120 to specify information on the electronic data format to be transmitted to the bookkeeping server 130, and generates electronic data (bookkeeping data) for the bookkeeping server based on the specified format (S519). The request control unit 431 transmits the bookkeeping data generated in S519, which may be accounting data, to the bookkeeping server 130 (S520). When completing the reception of the bookkeeping data transmitted by the cooperation server 120, the bookkeeping server 130 notifies the cooperation server 120 of information indicating the reception completion.

FIGS. 6A to 6C are diagrams showing screen examples displayed on the MFP 110. Each screen of FIGS. 6A to 6C is displayed on the operation unit 220 of the MFP 110 or the display device of the client terminal 111. FIG. 6A is a diagram showing an example of a screen 600 (bookkeeping/accounting information confirmation screen). The screen 600 shows the results of the scan and image analysis processing. The screen 600 is displayed on the operation unit 220. The user can confirm and correct the electronic data to be transmitted to the bookkeeping server 130 on the screen 600 displayed on the operation unit 220. The screen 600 includes a scanned image 601, a send button 604, and a cancel button 609. The send button 604 is shown as an "OK" button. The send button 604 is a button for confirming the contents of the screen 600 and transmitting the electronic data to the cooperation server 120. The cancel button 609 is a button for closing the screen 600.

The screen 600 includes items regarding an amount 602 and a tax rate 603. The amount 602 is price information obtained as a result of character recognition of the price of each item included in the form. In the example of FIG. 6A, four pieces of price information corresponding to the items of the amount 602 are shown. A plurality of pieces of price information of the amount 602 is arranged below the display of "amount" according to the number of pieces of item information included in the scanned form. The tax rate 603 is tax rate information corresponding to each item. The pieces of tax rate information are arranged side by side with the corresponding price information. In the example of FIG. 6A, the tax rate is "8%" or "10%". Each piece of information of the amount 602 and the tax rate 603 is obtained from electronic data that is an analysis result of the image analysis processing.

A first total amount excluding tax 606 is an item indicating the total value of amounts at the tax rate of "8%". The second total amount excluding tax 607 is an item indicating the total value of amounts at the tax rate of "10%". For example, different tax rates may be applied depending on the type of item in some countries. In such a case, the total values for the respective tax rates are displayed on the screen 600. A total amount 608 indicates the total amount obtained from the analysis result of the scanned form.

A screen 610 in FIG. 6B is an example of a screen displayed when the verification result is not reliable (reliability thereof is low). A first total amount excluding tax 611 and a second total amount excluding tax 612 are similar to the first total amount excluding tax 606 and the second total amount excluding tax 607 in FIG. 6A. The first total amount excluding tax 611 is "20745", and the tax rate thereof is "8%". The second total amount excluding tax 612 is "1113", and the tax rate thereof is "10%". Therefore, when fractions after the decimal point are also taken into consideration, the total amount including tax is calculated as "23628.9".

Here, there is a case where a method of rounding is different in bookkeeping or accounting operations. For example, depending on the practice of bookkeeping and accounting operations, a rounding method may adopt rounding down/truncation, rounding off, and rounding up. For example, when a rounding method adopted in a certain group is rounding off, the numerical value of the total amount 613 in FIG. 6B is originally "23629" (in the form), and thus "23628" is an unreliable value. In this case, a warning 614 indicating that the verification result is not reliable is displayed on the screen 610. The warning 614 is an icon for prompting the user to confirm the character recognition result.

FIG. 6C shows a screen 620 displayed when the total amount obtained by calculation from the sum for respective tax rates is compared with the total amount 621, and the total amount does not match that of FIG. 6A, but the total amount is reliable as a result of the verification. For example, a rounding method adopted in the above group is rounding off. In this case, the value of the total amount 621 on the screen 620 is "23629", and the value is a reliable (highly reliable) value. In the case of the example of FIG. 6C, since the calculation result is reliable, the icon indicating the warning is not displayed on the screen 620.

Here, in the present embodiment, as shown in FIGS. 6A to 6C, calculation of adding numerical values reflecting corresponding tax rates to the respective prices of a plurality of items included in a form is performed. That is, the cooperation server 120 calculates the sum of the prices reflecting the tax rates as the calculation result. However, the cooperation server 120 as the image processing apparatus may perform calculation other than the calculation of adding the prices. For example, the cooperation server 120 may perform subtraction of a numerical value including a fraction, obtain a result of the subtraction as a calculation result, and determine reliability of the calculation result. The cooperation server 120 may determine the reliability of the calculation result by verifying a calculation result obtained by performing another calculation (multiplication, division, or the like) on a plurality of numerical values including a fraction. Furthermore, the cooperation server 120 may determine the reliability of the calculation result by verifying a calculation result obtained by performing the calculation other than the four arithmetic operations on a plurality of numerical values including a fraction.

Figure 7:
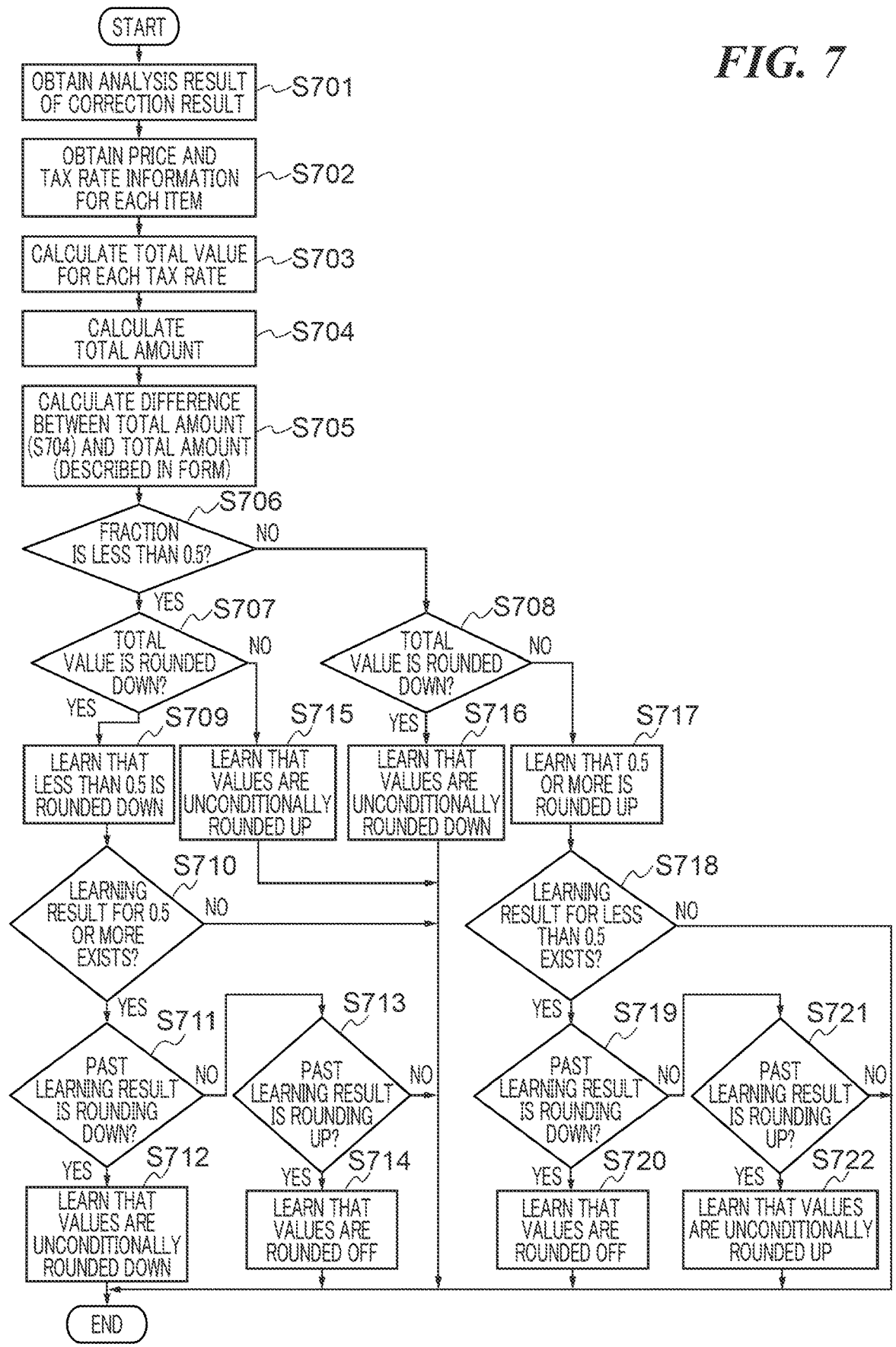
FIG. 7 is a flowchart showing an example of a flow of learning process for rounding processing.

FIG. 7 is a flowchart showing an example of a flow of learning process for rounding processing. Each process of FIG. 7 is a process for learning which one of rounding down, rounding off, and rounding up should be applied as the rounding processing applied to the verification of the sum as the calculation result. Hereinafter, an example of learning of application of three types of rounding processing including rounding down, rounding off, and rounding up will be described as the rounding processing. However, rounding processing other than the three types of rounding processing may be applied as the rounding processing to be learned, or two types of rounding processing among the three types of rounding processing may be applied.

The CPU 311 of the cooperation server 120 obtains an analysis result obtained by analyzing the confirmed content obtained in S517 (S701). The analysis result includes at least information such as a price, tax rate information, and a total amount for each item used in the above-described verification processing. The CPU 311 obtains the price and the tax rate information for each item from the information included in the analysis result (S702). The CPU 311 calculates the total value for each tax rate based on the price and the tax rate information for each item obtained in S702, and calculates the price including tax in consideration of the tax rate corresponding to each total value (S703). The CPU 311 calculates the total amount by adding the price including tax for each tax rate (S704). The CPU 311 holds the calculated total amount as a calculation result including decimals using a floating point or a fixed point.

The CPU 311 calculates a difference between the total amount calculated in S704 and the total amount described in the form obtained by the character recognition processing (that is, the total amount of money described in the form obtained by performing character recognition processing on the image data generated by scanning the form) (S705). The total amount calculated in S704 is a value including decimals as described above. On the other hand, the total amount described in the form is assumed to be an integer. The CPU 311 determines whether the decimal part (fraction) of the difference calculated in S705 is less than a predetermined threshold (=0.5) (S706). When Yes is obtained in S706, the CPU 311 advances the flow to S707. On the other hand, when No is obtained in S706, the CPU 311 advances the flow to S708.

The CPU 311 compares the total amount calculated in S704 with the total amount described in the form obtained by the character recognition processing, and determines whether the total amount described in the form is obtained by rounding down the total amount calculated in S704 (S707). When Yes is obtained in S707, the CPU 311 advances the flow to S709. On the other hand, when No is obtained in S707, the CPU 311 advances the flow to S715. In S709, the CPU 311 learns "rounding down" as the learning result in the case where the fraction is less than 0.5. The CPU 311 stores the learning result (learning result that is rounding down when the fraction is less than 0.5) in the learning DB 436.

The CPU 311 determines whether the learning result in the case where the fraction is 0.5 or more is stored in the learning DB 436 as the past learning result (S710). When Yes is obtained in S710, the CPU 311 advances the flow to S711. On the other hand, when No is obtained in S710, the CPU 311 terminates the flowchart of FIG. 7. Furthermore, the CPU 311 refers to the learning DB 436 and determines whether all the past learning results in the case where the fraction is 0.5 or more were rounding down (S711). When Yes is obtained in S711, the CPU 311 advances the flow to S712. When No is obtained in S711, the CPU 311 advances the flow to S713. In S712, the CPU 311 learns that the decimal part (fraction) of the difference between the calculated total amount and the total amount described in the form is rounded down unconditionally without considering the magnitude of the decimal part (fraction). That is, "unconditionally rounding down the fraction" is stored in the learning DB 436 as the learning result. After executing the process of S712, the CPU 311 terminates the flowchart of FIG. 7.

As described above, when No is obtained in S711, the CPU 311 advances the flow to S713. The CPU 311 determines whether all the past learning results in the case where the fraction is 0.5 or more are rounding up (S713). When Yes is obtained in S713, the CPU 311 advances the flow to S714. In S714, the CPU 311 learns "rounding off the fraction" as the learning result. At this time, the CPU 311 stores "rounding off the fraction" in the learning DB 436 as the learning result. When No is obtained in S713 or after executing the process of S714, the CPU 311 terminates the flowchart of FIG. 7.

As described above, when No is obtained in S707, the CPU 311 advances the flow to S715. In this case, the fraction is less than 0.5, and the total amount described in the form is not rounded down. Therefore, the CPU 311 learns that the decimal part (fraction) of the difference between the calculated total amount and the total amount described in the form is rounded up unconditionally without considering the magnitude of the decimal part (fraction) (S715). That is, "unconditionally rounding up the fraction" is stored in the learning DB 436 as the learning result.

As described above, when No is obtained in S706, the CPU 311 advances the flow to S708. The CPU 311 compares the total amount calculated in S704 with the total amount described in the form obtained by the character recognition processing, and determines whether the total amount described in the form is obtained by rounding down the total amount calculated in S704 (S708). When Yes is obtained in S708, the CPU 311 advances the flow to S716. At this time, the CPU 311 learns that the decimal part (fraction) of the difference between the calculated total amount and the total amount described in the form is rounded down unconditionally without considering the magnitude of the decimal part (fraction) (S716). That is, "unconditionally rounding down the fraction" is stored in the learning DB 436 as the learning result. After executing the process of S716, the CPU 311 terminates the flowchart of FIG. 7.

When No is obtained in S708, the CPU 311 advances the flow to S717. The CPU 311 learns "rounding up" as a learning result in a case where the fraction is 0.5 or more (S717). The CPU 311 stores the learning result (learning result that is rounding up when the fraction is 0.5 or more) in the learning DB 436.

The CPU 311 determines whether the learning result in the case where the fraction is less than 0.5 is stored in the learning DB 436 as the past learning result (S718). When Yes is obtained in S718, the CPU 311 advances the flow to S719. On the other hand, when No is obtained in S718, the CPU 311 terminates the flowchart of FIG. 7. Furthermore, the CPU 311 refers to the learning DB 436 and determines whether all the past learning results in the case where the fraction is less than 0.5 were rounding down (S719). When Yes is obtained in S719, the CPU 311 advances the flow to S720. On the other hand, when No is obtained in S719, the CPU 311 advances the flow to S721. In S720, the CPU 311 learns "rounding off" as a learning result. At this time, the CPU 311 stores "rounding off" as the learning result in the learning DB 436. After executing the process of S720, the CPU 311 terminates the flowchart of FIG. 7.

When No is obtained in S719, the CPU 311 advances the flow to S721. In S721, the CPU 311 determines whether the past learning result in the case where the fraction is less than 0.5 is rounding up. When Yes is obtained in S721, the CPU 311 advances the flow to S722. At this time, the CPU 311 learns that the decimal part (fraction) of the difference between the calculated total amount and the total amount described in the form is rounded up unconditionally without considering the magnitude of the decimal part (fraction) (S722). That is, "unconditionally rounding up the fraction" is stored in the learning DB 436 as the learning result. When No is obtained in S721 or after executing the process of S722, the CPU 311 terminates the flowchart of FIG. 7. As described above, the learning DB 436 stores any one of the learning results of rounding down, rounding off, and rounding up.

Figure 8:
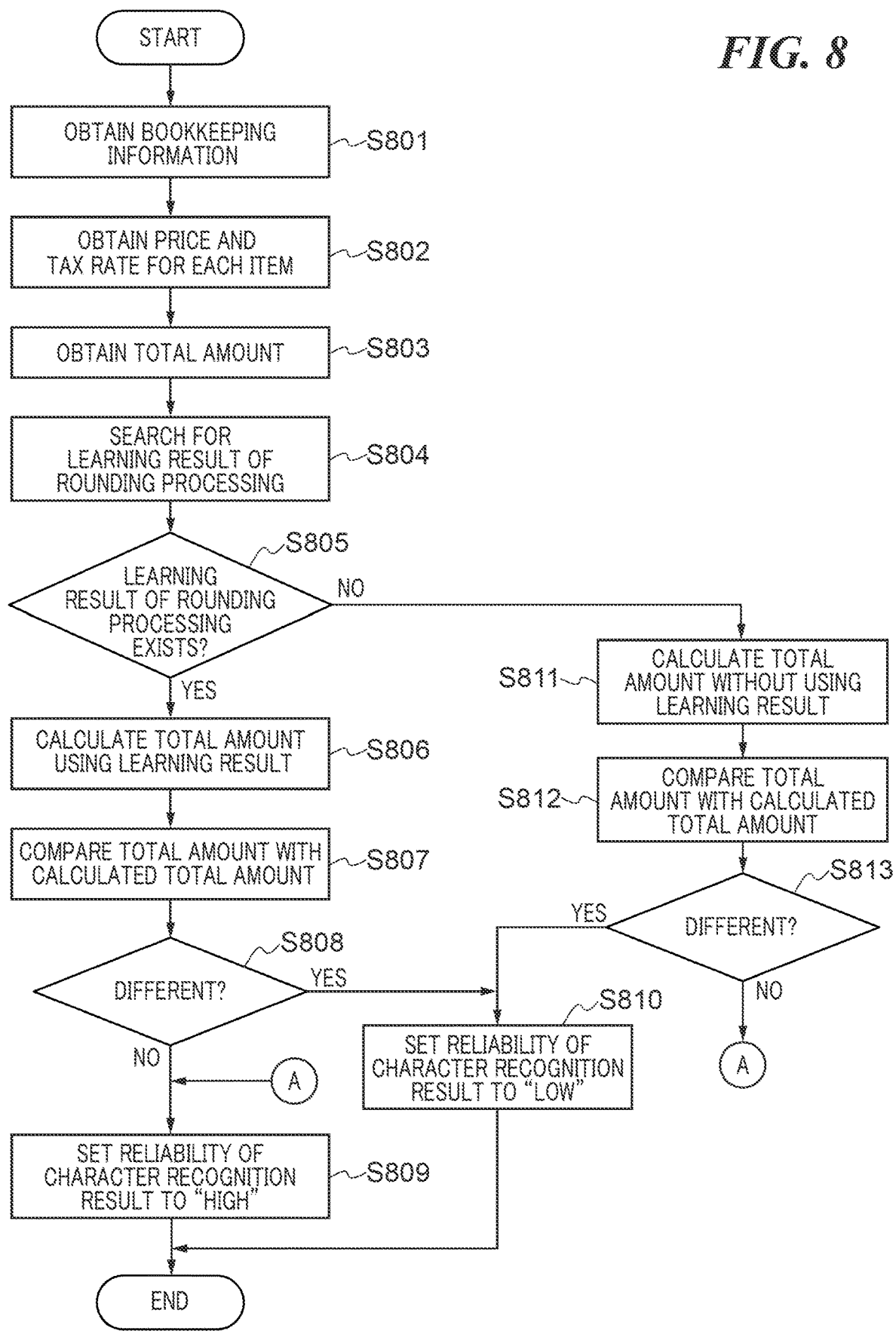
FIG. 8 is a flowchart showing an example of a flow of verification processing.

Next, a verification process involving rounding processing will be described. FIG. 8 is a flowchart showing an example of a flow of verification processing. The flowchart of FIG. 8 is processing performed based on the character recognition result on the scan image and the bookkeeping information extracted in S509 of FIG. 5, and corresponds to the verification processing in S510. The CPU 311 of the cooperation server 120 acquires the bookkeeping information (or accounting information) extracted in S509 of FIG. 5 (S801). The bookkeeping information includes bookkeeping and accounting information such as an amount of money and a tax rate. The CPU 311 obtains information on the price and the tax rate for each item from the bookkeeping information (S802). The CPU 311 obtains the total amount based on the information on the price and the tax rate obtained in S802 (S803).

The CPU 311 searches whether the learning result of the rounding processing is stored in the learning DB 436 (S804). As a result of the search in S804, the CPU 311 determines whether the learning result of the rounding processing is stored in the learning DB 436 (S805). When Yes is obtained in S805, the CPU 311 advances the flow to S806. The CPU 311 acquires the learning result stored in the learning DB 436, and calculates the total amount using the acquired learning result (S806). At this time, the CPU 311 calculates the total amount including the fraction using the price and the tax rate for each item obtained from the character recognition result for the scan image, and performs the rounding processing according to the acquired learning result. For example, when the acquired learning result is rounding off, the CPU 311 performs rounding-off processing on the calculated total amount including the fraction. In a case where the learning result is rounding up or rounding down, the CPU 311 performs rounding processing according to each case on the calculated total amount including the fraction.

The CPU 311 compares the total amount obtained in S803 with the total amount calculated in S806 (S807). As a result of the comparison in S807, the CPU 311 determines whether there is a difference between the total amount obtained in S803 and the total amount calculated in S806 (S808). When No is obtained in S808 (when there is no difference), the CPU 311 advances the flow to S809. If No is obtained in S808, since there is no difference between the total amount obtained in S803 and the total amount calculated in S806, the CPU 311 sets the parameter of the reliability of the extraction result (character recognition result) of the bookkeeping information in S509 of FIG. 5 to "high" (S809). After executing the process of S809, the CPU 311 terminates the flowchart of FIG. 8. On the other hand, when Yes is obtained in S808 (when there is a difference), the CPU 311 advances the flow to S810. If Yes is obtained in S808, since there is a difference between the total amount obtained in S803 and the total amount calculated in S806, the CPU 311 sets the parameter of the reliability of the extraction result (character recognition result) of the bookkeeping information in S509 of FIG. 5 to "low" (S810). After executing the process of S810, the CPU 311 terminates the flowchart of FIG. 8.

When No is obtained in S805, the CPU 311 advances the flow to S811. In this case, the learning result of the rounding processing is not stored in the learning DB 436. The CPU 311 calculates the total amount including the fraction using the price and the tax rate for each item obtained from the character recognition result for the scan image without using the learning result of the rounding processing (S811). The CPU 311 compares the total amount obtained in S803 with the total amount calculated in S811 (S812). As a result of the comparison in S812, the CPU 311 determines whether there is a difference between the total amount obtained in S803 and the total amount calculated in S811 (S813). When Yes is obtained in S813 (when there is a difference), the CPU 311 advances the flow to S810. In this case, it is determined that the reliability of the extraction result (character recognition result) of the bookkeeping information in S509 of FIG. 5 is low. On the other hand, when No is obtained in S813 (when there is no difference), the CPU 311 advances the flow to S809. In this case, it is determined that the reliability of the character recognition result is high.

By executing each process of the flowchart of FIG. 8, the CPU 311 can determine whether the reliability of the extraction result (character recognition result) of the bookkeeping information in S509 of FIG. 5 is high or low. The cooperation server 120 returns information on the determined reliability to the MFP 110 as an analysis result. Then, when the received information indicates that the reliability is low, the MFP 110 displays the icon of the warning 614 as shown in FIG. 6B. As a result, it is possible to prompt the user operating the MFP 110 or the client terminal 111 to confirm the character recognition result because the reliability of the total amount is low.

As described above, in the preferred embodiment, it is possible to perform verification in consideration of rounding processing on the character recognition result of numerical values such as amounts of money that are important in bookkeeping and accounting operations. As a result, it is possible to improve reliability of character recognition processing in consideration of rounding processing. In addition, in a case where there is an error in the value of the amount included in the form, the user can easily determine whether the cause is an error in the character recognition result or a difference in business practice or the like (a difference in a method of rounding processing).

Second Embodiment

Figure 9:
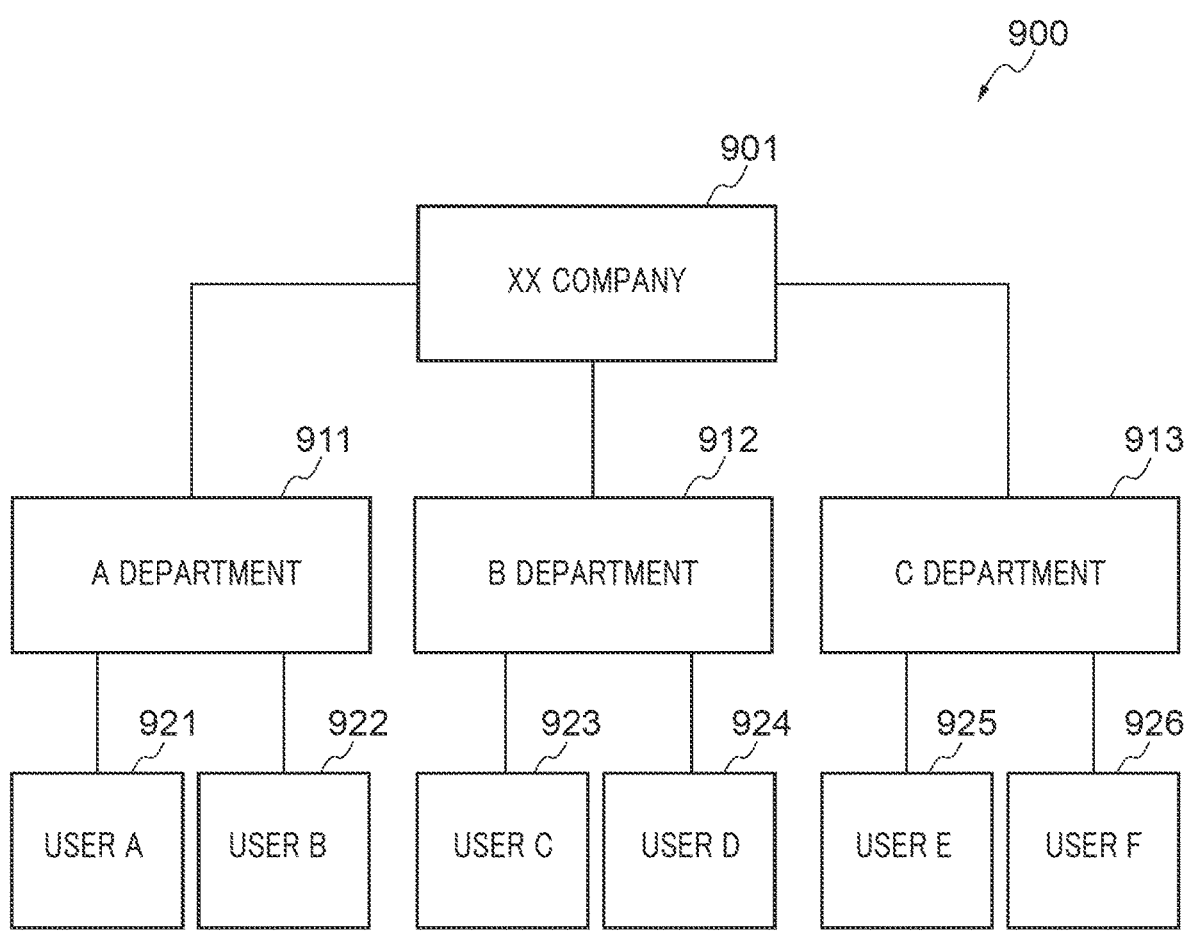
FIG. 9 is a diagram showing an example of a tenant structure according to a second embodiment.

In the first embodiment, the image processing unit 432 of the cooperation server 120 learns a processing method of rounding processing in S518, and stores a learning result in the learning DB 436 in association with an identifier ScopeID for uniquely specifying a group of users. In the second embodiment, the image processing unit 432 of the cooperation server 120 learns the learning result in association with the organization information of the tenant. FIG. 9 is a diagram showing an example of a tenant structure according to the second embodiment. The data of a tenant 900 is stored in the data management unit 434. The tenant 900 is data for structurally managing an organization and users of a company "XX company". It is also possible to adopt a multi-tenant for the tenant 900 and structurally manage organizations other than the XX company.

Company data 901 indicates that the managed organization is XX company. The company data 901 has department data 911 to 913 at a lower level. The company data 901 may include data specific to the company (for example, an ID specific to a company, authority information permitted by the company, and the like). In the second embodiment, the ID unique to the company is generated using the UUID. The company data 901 may be company data or data of other groups, organizations, or the like.

The department data 911 to 913 are low-order data of the company data 901, and are data indicating respective departments under control of the XX company. The department data 911 to 913 has user data 921 to 923 at a lower level. In the user data 921 to 923, a structure of users belonging to each department is expressed. Each department data 911 to 913 may include department-specific data, a department-specific ID, authority information permitted to a department, and the like. Department-specific IDs are generated using UUIDs. The user data 921 to 926 is data associated with users belonging to each department for the department data 911 to 913. The user data 921 to 926 may include data specific to each user, a user-specific ID, authority information permitted to the user, and the like. The user-specific ID is generated using the UUID.

Figure 10:
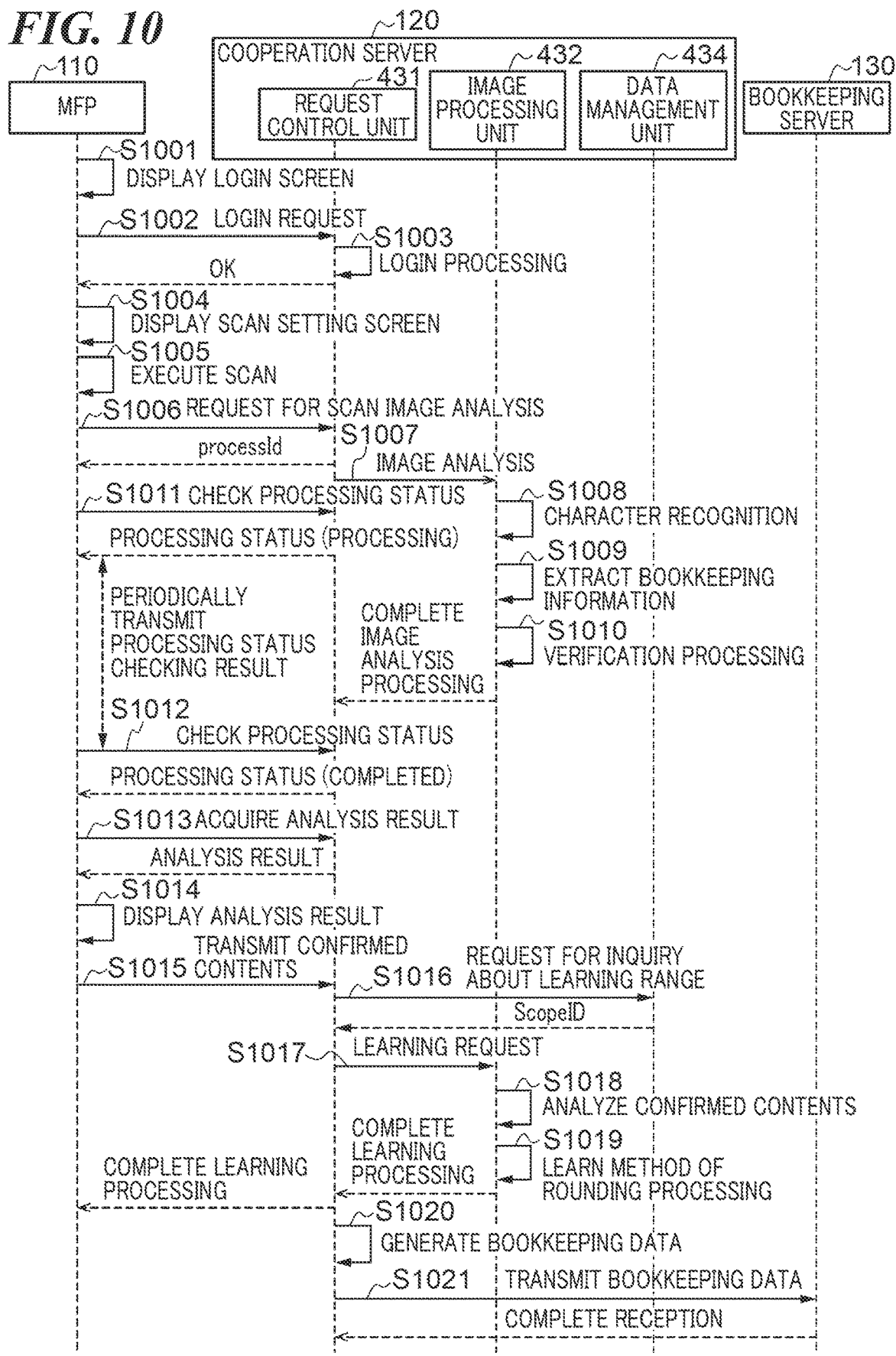
FIG. 10 is a sequence diagram showing an example of a flow of processing of the image processing system in the second embodiment.

FIG. 10 is a sequence diagram showing an example of a flow of processing of the image processing system 100 in the second embodiment. Since each processing other than S1016 to S1019 is similar to each processing in the sequence diagram of FIG. 5, the description thereof will be omitted. In addition, the sequence diagram of FIG. 10 is obtained by adding the data management unit 434 to the sequence diagram of FIG. 5. When the send button 604 in FIGS. 6A to 6C is pressed in S1015 (corresponding to S515 in FIG. 5), the MFP 110 transmits the electronic data related to the content of the screen 600 to the cooperation server 120, and the request control unit 431 of the cooperation server 120 receives the transmitted electronic data. The request control unit 431 sends a request for an inquiry about the learning range to the data management unit 434 (S1016). The data management unit 434 reads the company data 901 of the tenant 900 and reads the ID of the company data 901 on the basis of the received request for inquiry about the learning range. The data management unit 434 returns the read ID of the company data 901 to the request control unit 431 as ScopeID indicating the learning range.

The request control unit 431 designates the ID of the company data 901 as the learning range (ScopeID) and requests the image processing unit 432 to perform learning process (S1017). The image processing unit 432 analyzes a result of the correction processing performed by the user (S1018). Then, the image processing unit 432 learns the processing method of the rounding processing using the analysis result of S1018, and stores the learning result in the learning DB 436 in association with the ScopeID (ID of the company data 901) (S1019).

As described above, in the second embodiment, by applying the ID of the company data 901 to the ScopeID indicating the learning range, the learning result stored in the learning DB 436 can be shared among users in the company. In the example described above, the ID of the company data 901 is applied to the Scope ID, but the ID of the department data 911 to 913 may be applied to the Scope ID. As a result, the learning results can be shared among users of each department. It should be noted that any method may be applied to generate each ID in the tenant 900 as long as it is a method of generating unique data. For example, the unique ID in the tenant 900 may be generated by incrementing the ID each time new data is generated in the tenant 900.

Third Embodiment

Figure 11:
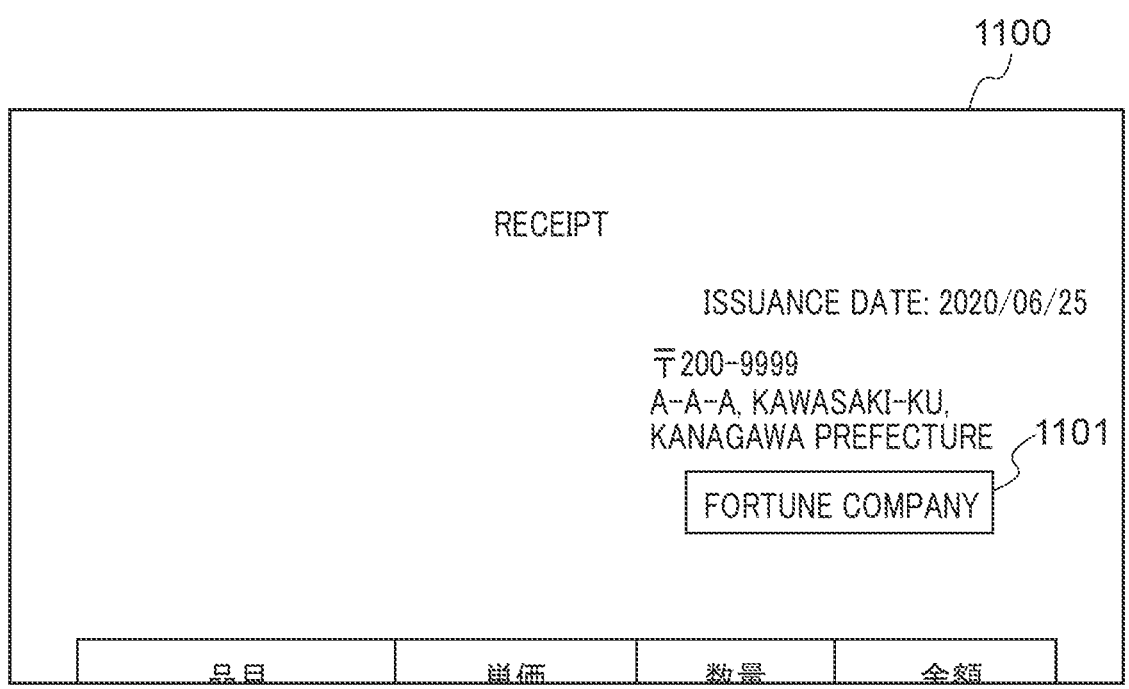
FIG. 11 is a diagram showing an example of a form from which issuer information is extracted.

In the third embodiment, the learning process is performed in association with issuer information of a form such as a receipt. FIG. 11 is a diagram showing an example of a form from which issuer information is extracted. A receipt 1100 of FIG. 11 shows a portion of the receipt. By scanning the receipt 1100, the company information 1101 included in the character information of the image data is extracted. The company information 1101 is issuer information and is information indicating an organization. The information indicating the organization is not limited to the information indicating the company, and may be, for example, information indicating an administrative organization or the like. In the third embodiment, the extracted company information 1101 or the hash value of the company information 1101 is applied to the ScopeID.

Figure 12:
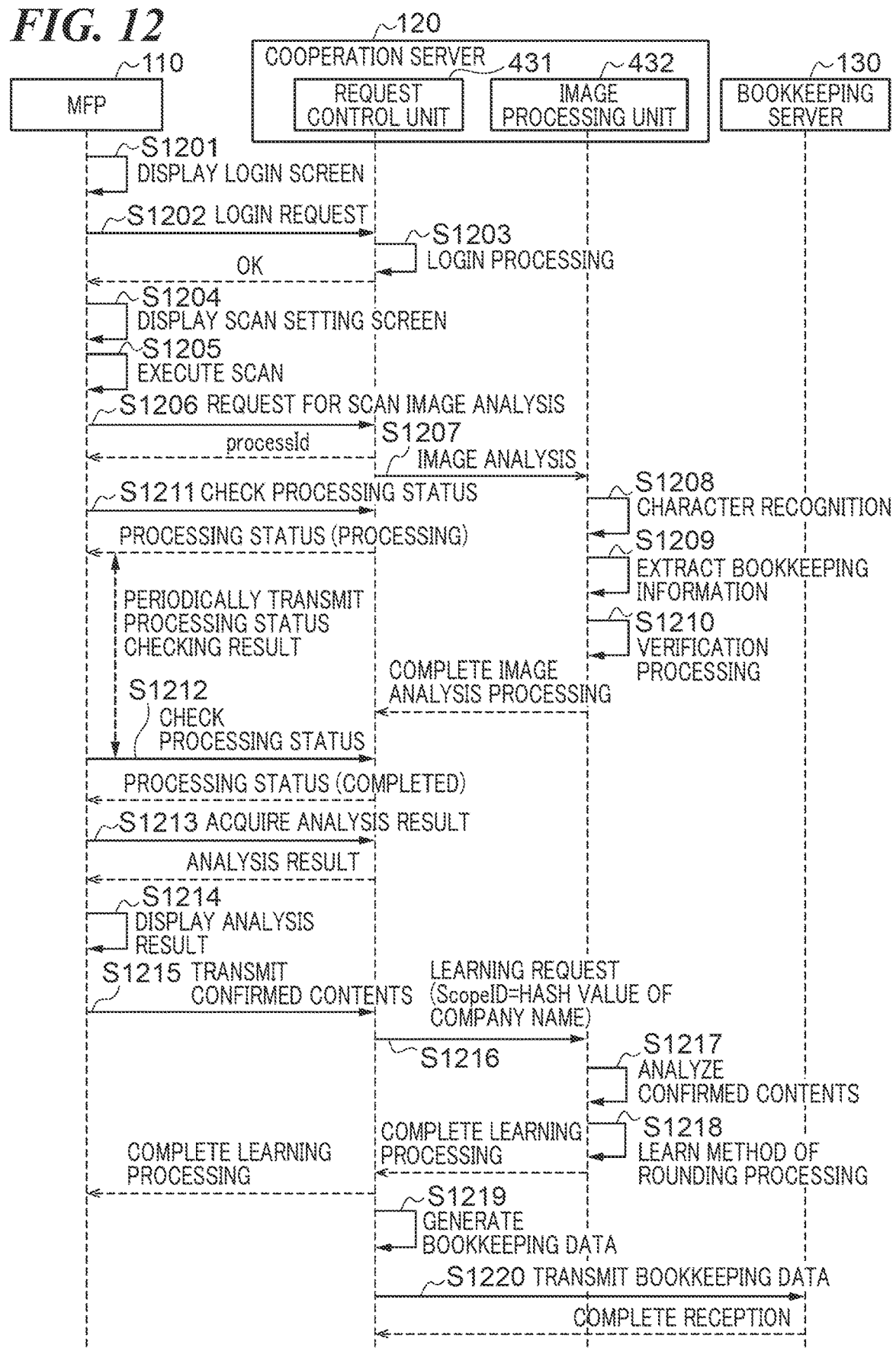
FIG. 12 is a sequence diagram showing an example of a flow of processing of an image processing system in a third embodiment.

FIG. 12 is a sequence diagram showing an example of a flow of processing of the image processing system 100 in the third embodiment. Since the processes other than S1208 and S1216 to S1218 are similar to the processes in FIG. 5, the description thereof will be omitted.

In S1207 (corresponding to S507 in FIG. 5), the image processing unit 432 of the cooperation server 120 performs the above-described image analysis processing. The image processing unit 432 performs analysis and extraction processing of character information similar to that in S508 (S1208). At this time, the image processing unit 432 extracts company information 1101 included in the receipt 1100 of the example of FIG. 11, and converts information such as the company name together with the amount of money, the tax rate, and the item into structured electronic data. The image processing unit 432 converts the extracted company name information into a hash value. The image processing unit 432 passes the hash value to the request control unit 431. The request control unit 431 designates the learning range (ScopeID) and requests the image processing unit 432 to perform learning process (S1216). At this time, the request control unit 431 sets the above-described hash value (hash value of the company name) as the learning range (ScopeID). The image processing unit 432 analyzes a confirmed content (S1217). The image processing unit 432 learns a processing method of rounding processing using the analysis result of S1217 (S1218). The image processing unit 432 stores the learning result in the learning DB 436 in association with the ScopeID (hash value of the company name).

As described above, by setting the hash value of the company name as the ScopeID indicating the learning range, it is possible to store the learning result for each company in the form. In the above-described example, the hash value is used for the ScopeID. However, as long as the data is data in which the company name is uniquely specified, the ScopeID (data in which the company name is uniquely specified) may be generated using an arbitrary algorithm or an arbitrary processing.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-204959, filed Dec. 10, 2020, which is hereby incorporated by reference wherein in its entirety.

What is claimed is:

1. An image processing apparatus comprising:
at least one memory that stores instructions; and
at least one processor that executes the instructions to:
perform character recognition for first image data to obtain a first plurality of numerical values, including first amounts about first items and a first total amount about the first items;
learn a rounding processing method on a basis of a difference between the first total amount and a calculation result obtained from a calculation based on the first amounts; and
perform character recognition for second image data to obtain a second plurality of numerical values, including second amounts about second items and a second total amount about the second items; and
determine reliability of the character recognition performed for the second image data from a calculation based on the second amounts about the second items and the learned rounding processing method.

2. The image processing apparatus according to claim 1, wherein:
the first amounts include prices of the first items and a tax rate, and
the obtained calculation result is a sum of amounts based on the prices of the first items and the tax rate.

3. The image processing apparatus according to claim 1, wherein the learned rounding processing method is one of rounding down, rounding off, or rounding up.

4. The image processing apparatus according to claim 1, wherein the learned rounding processing method is stored in a storage unit in association with each of a plurality of groups.

5. The image processing apparatus according to claim 4, wherein the learned rounding processing method is stored in the storage unit in association with an identifier indicating an organization as the group.

6. The image processing apparatus according to claim 4, wherein:
the first image data includes information indicating an organization, and
the learned rounding processing method is stored in the storage unit in association with a hash value of character information obtained by character recognition of the information indicating the organization.

7. The image processing apparatus according to claim 6, wherein:
the first image data is acquired by scanning a form, and
the information indicating the organization is information of a company name described in the form.

8. The image processing apparatus according to claim 1, wherein a parameter indicating the reliability is displayed on another apparatus that has acquired the second image data.

9. The image processing apparatus according to claim 1, wherein the learned rounding processing method is learned on a basis of the difference between the first total amount and the obtained calculation result, which are confirmed by a user.

10. An image processing method comprising:
performing character recognition for first image data to obtain a first plurality of numerical values, including first amounts about first items and a first total amount about the first items;
learning a rounding processing method on a basis of a difference between the first total amount and a calculation result obtained from a calculation based on the first amounts;
performing character recognition for second image data to obtain a second plurality of numerical values, including second amounts about second items and a second total amount about the second items; and
determining reliability of the character recognition performed for the second image data from a calculation based on the second amounts about the second items and the learned rounding processing method.

11. A computer-readable non-transitory storage medium that stores a program executable by a computer to execute an image processing method comprising:
performing character recognition for first image data to obtain a first plurality of numerical values, including first amounts about first items and a first total amount about the first items;
learning a rounding processing method on a basis of a difference between the first total amount and a calculation result obtained from a calculation based on the first amounts;
performing character recognition for second image data to obtain a second plurality of numerical values, including second amounts about second items and a second total amount about the second items; and
determining reliability of the character recognition performed for the second image data from a calculation based on the second amounts about the second items and the learned rounding processing method.

* * * * *